(12) United States Patent
Wieters et al.

(10) Patent No.: US 12,529,883 B2
(45) Date of Patent: Jan. 20, 2026

(54) VIDEO ENDOSCOPE

(71) Applicant: OLYMPUS Winter & Ibe GmbH, Hamburg (DE)

(72) Inventors: Martin Wieters, Barsbuettel (DE); Sebastian Jungbauer, Hamburg (DE); Timo Pfander, Hamburg (DE); Claudia Stoeter, Hamburg (DE); Mathias Laser, Hamburg (DE)

(73) Assignee: OLYMPUS Winter & Ibe GmbH, Hamburg (DE)

( * ) Notice: Subject to any disclaimer, the term of this patent is extended or adjusted under 35 U.S.C. 154(b) by 599 days.

(21) Appl. No.: 17/870,083

(22) Filed: Jul. 21, 2022

(65) Prior Publication Data

US 2022/0373781 A1 Nov. 24, 2022

Related U.S. Application Data

(63) Continuation-in-part of application No. 16/047,138, filed on Jul. 27, 2018, now abandoned, which is a
(Continued)

(30) Foreign Application Priority Data

Feb. 11, 2016 (DE) .................. 102016202093.5

(51) Int. Cl.
*A61B 1/00* (2006.01)
*G02B 23/24* (2006.01)
(Continued)

(52) U.S. Cl.
CPC ......... *G02B 23/2484* (2013.01); *G02B 23/26* (2013.01); *G02B 27/0006* (2013.01);
(Continued)

(58) Field of Classification Search
CPC ..... A61B 1/00097; A61B 1/127; A61B 1/128; A61B 1/00096; A61B 1/00135;
(Continued)

(56) References Cited

U.S. PATENT DOCUMENTS 4,968,388 A 11/1990 Heydecke et al.
5,605,532 A * 2/1997 Schermerhorn ....... A61B 1/127
600/176
(Continued)

FOREIGN PATENT DOCUMENTS

DE 3832957 A1 3/1990
DE 202005019684 U1 5/2006
(Continued)

OTHER PUBLICATIONS

International Search Report dated May 9, 2017 received in PCT/EP2017/052579.
(Continued)

*Primary Examiner* — Michael J Carey
*Assistant Examiner* — Stephen Floyd London
(74) *Attorney, Agent, or Firm* — Scully, Scott, Murphy & Presser, P.C.

(57) ABSTRACT

A video endoscope including: an outer cladding tube, a fiber tube accommodated in the outer cladding tube, wherein the fiber tube has a housing bounding a closed space with a distal end and a proximal end, wherein a front-side window is provided at the distal end of the fiber tube, the fiber tube having an inner tube (for accommodating an imaging sensor, and a heating foil provided between the fiber tube and the inner tube. Where, the heating foil is adapted to heat the front-side window at the distal end of the fiber tube.

18 Claims, 6 Drawing Sheets

Related U.S. Application Data continuation of application No. PCT/EP2017/052579, filed on Feb. 7, 2017.

(51) Int. Cl.
- *G02B 23/26* (2006.01)
- *G02B 27/00* (2006.01)
- *H04N 23/51* (2023.01)
- *H04N 23/52* (2023.01)
- *H04N 23/57* (2023.01)
- *H05B 3/84* (2006.01)
- *H04N 23/50* (2023.01)

(52) U.S. Cl.
CPC ............. *H04N 23/51* (2023.01); *H04N 23/52* (2023.01); *H04N 23/57* (2023.01); *H05B 3/84* (2013.01); *A61B 1/0011* (2013.01); *H04N 23/555* (2023.01)

(58) Field of Classification Search
CPC ........... A61B 1/00165; A61B 1/00167; A61B 1/0017; A61B 1/05; A61B 1/051; A61B 1/053
USPC ......................................................... 600/128
See application file for complete search history.

(56) References Cited

U.S. PATENT DOCUMENTS

| | | | | |
|---|---|---|---|---|
| 5,894,369 | A * | 4/1999 | Akiba | G02B 23/2423 600/110 |
| 2010/0016671 | A1 | 1/2010 | Wieters et al. | |
| 2010/0268027 | A1 | 10/2010 | Aono et al. | |
| 2010/0268032 | A1 * | 10/2010 | Seeh | A61B 1/002 600/169 |
| 2010/0309553 | A1 * | 12/2010 | Nagamizu | G02B 27/0006 359/512 |
| 2011/0092769 | A1 * | 4/2011 | Kokubo | A61B 1/128 600/109 |
| 2011/0245608 | A1 * | 10/2011 | Takahashi | A61B 1/051 600/109 |
| 2013/0116507 | A1 * | 5/2013 | Segawa | A61B 1/045 600/109 |
| 2013/0303853 | A1 * | 11/2013 | Takahashi | G02B 23/2476 600/134 |
| 2014/0088366 | A1 * | 3/2014 | Solingen | A61B 1/00135 600/169 |
| 2014/0221743 | A1 * | 8/2014 | Sugiyama | A61B 1/0676 600/109 |
| 2015/0313454 | A1 | 11/2015 | Ide | |
| 2017/0007110 | A1 | 1/2017 | Ide | |
| 2017/0215718 | A1 * | 8/2017 | Schan | A61B 1/05 |
| 2018/0024348 | A1 | 1/2018 | Wieters et al. | |
| 2018/0228357 | A1 * | 8/2018 | Fujii | A61B 1/127 |
| 2018/0235454 | A1 * | 8/2018 | Tsai | A61B 1/0014 |

FOREIGN PATENT DOCUMENTS

| | | |
|---|---|---|
| DE | 102008031924 A1 | 1/2010 |
| DE | 102015101624 A1 | 8/2016 |
| JP | H2-257926 A | 10/1990 |
| JP | 2002291684 A | 10/2002 |
| JP | 2006000282 A | 1/2006 |
| JP | 2007175230 A | 7/2007 |
| JP | 2014131531 A | 7/2014 |

OTHER PUBLICATIONS

Japanese Office Action dated Oct. 6, 2020 received in 2018-541626.

* cited by examiner

VIDEO ENDOSCOPE

CROSS-REFERENCE TO RELATED APPLICATION

The present application is a Continuation-In-Part Application of U.S. patent application Ser. No. 16/047,138, filed on Jul. 27, 2018, which is a continuation of PCT/EP2017/052579 filed on Feb. 7, 2017, which is based upon and claims the benefit to DE 10 2016 202 093.5 filed on Feb. 11, 2016, the entire contents of each of which are incorporated herein by reference.

BACKGROUND

Field

The present disclosure relates to a video endoscope.

Prior Art

During the assembly of endoscopes, inner tubes that are relatively narrowly designed with regard to their fit are often inserted into an outer casing tube in order to prevent misalignment. In particular with video endoscopes, for example, the video unit, which is also termed an R-unit, is inserted into an outer casing tube. The video unit hereby comprises an inner tube or respectively an inner casing tube into which the optical elements and also a video camera or at least one light-sensitive chip, such as, for example, a CCD chip, are integrated. In order to enable an exact alignment or an exact fixing of the inner tube to the optical axis, the fit to the outer casing tube, or respectively the tube into which the inner tube or respectively the inner casing tube for the image-forming unit is inserted, is relatively narrow.

In particular with video endoscopes, the image-forming unit or respectively the so-called R-unit is inserted into the outer casing tube or respectively into a fiber tube and is proximally fixed. A heat-shrinkable sleeve is pulled over the casing tube for the R-unit, wherein the heat-shrinkable sleeve serves to prevent the inner casing tube from rattling and in addition to also cause an electrical insulation. A heating film is applied to the fiber tube for the inner casing tube circumferentially over the circumference of the fiber tube.

FIG. 1 schematically shows a cross-section through an endoscope shaft 10 of a schematically indicated video endoscope E in detail, wherein the section in FIG. 1 shows a distal end region of the endoscope shaft 10.

The endoscope shaft 10 has an outer casing tube 1 that in the interior encloses a fiber tube 4 encased by a heating film 3. The fiber tube 4 is hereby eccentrically disposed in the outer casing tube 1. Between the fiber tube 4 or respectively the outer heating film 3 and the outer casing tube 1, the intermediate space is filled with optical fibers 2 that end distally in the front face of the video endoscope E.

The fiber tube 4 surrounds an inner casing tube 6 disposed in the interior of the fiber tube 4 for an image-forming unit (not represented here) for the video endoscope E. The image-forming unit can hereby be designed as a so-called R-unit, for example with a CCD chip.

Between the fiber tube 4 and the inner casing tube 6, a heat-shrinkable sleeve 5 is disposed that surrounds the inner casing tube 6.

To prevent a distal window (not represented here) of the video endoscope E from fogging, the fiber tube 4 is enclosed by the heating film 3, which is wrapped around the outer face of the fiber tube 4.

The heating film 3 is hereby attached via a cable (not represented here) in order to subject a heating resistor in the heating film 3 to electrical current, whereby the heating film 3 and the fiber tube 4 enclosed by the heating film 3 are heated so that a front-side window of the video endoscope E is heated.

SUMMARY

An object is to provide inter alia a video endoscope in which the heating of cover glasses at the distal end is safely protected during cleaning and/or disinfection.

Such object can be provided a video endoscope with an outer casing tube, wherein a fiber tube for an inner casing tube is accommodated in the outer casing tube, wherein an inner casing tube for an image-forming unit is accommodated in the fiber tube and wherein a heating film, which can surround the inner casing tube, is provided between the fiber tube and the inner casing tube.

The video endoscope has an outer casing tube and an inner casing tube for an image-forming unit. Furthermore, a fiber tube for the inner casing tube is provided, wherein the fiber tube is accommodated in the outer casing tube and the inner casing tube is accommodated in the fiber tube. In addition, a heating film that can surround the inner casing tube is disposed between the fiber tube in which the inner casing tube is accommodated and the inner casing tube.

In the video endoscope, a heating film instead of the previous heat-shrinkable sleeve is arranged on the inner casing tube for the image-forming unit or respectively the R-unit so that the heating film is or will be arranged between the inner casing tube and the fiber tube surrounding the inner casing tube, so that the heating film is used not only for heating but in addition is also designed as protection against rattling for the inner casing tube. Furthermore, the heating film can also be used as electrical insulation. This depends on the geometry of the installation space in the endoscope shaft or respectively in the outer casing tube.

By disposing the heating film (instead of the previous heat-shrinkable sleeve) between the fiber tube and the inner casing tube, the heat-shrinkable sleeve is omitted during assembly of the video endoscope, whereby a component (heat-shrinkable sleeve) is dispensed with. In addition, this simplifies the assembly of the endoscope since an assembly step is dispensed with. Moreover, with the omission of the heat-shrinkable sleeve, a reduction of the diameter is achieved so that more installation space is created, for example for optical fibers or the optical system, or more stable tubes can be used. In addition, it is possible, due to the reduction of the diameter, to provide video endoscopes that have a smaller diameter of the endoscope shaft.

The heating film heats, for example, a distal window of an endoscope in order to avoid fogging of the window. By means of the heating film, an electrical resistance heating is provided that can be disposed in the vicinity of the window in the endoscope shaft. A good heat transfer through the fiber tube to the window, which is soldered, for example, in the fiber tube that can be provided in good heat contact, is achieved by the contact of the heating film with the fiber tube, which can be formed of or can be produced from metal.

The inner casing tube can have a tube section, wherein the tube section of the inner casing tube is enclosed by the heating film in the circumferential direction. The heating film thereby surrounds the tube section of the inner casing tube.

In addition, the e heating film can be configured in a sleeve-shape or as a heating film sleeve.

The heating film can be in immediate or direct contact with the fiber tube and with the inner casing tube.

The heating film can be produced from plastic, such as polyimide. Heating films made of Kapton® can also be used.

In addition, in one embodiment of the video endoscope it is further provided that an optical fiber bundle can be accommodated in the outer casing tube next to the fiber tube for the inner casing tube.

At least one temperature sensor for detecting the temperature of the heating film can be provided, wherein the heating film can have the at least one temperature sensor. By means of the temperature sensor, the temperature of the heating film in the endoscope shaft is detected or established so that it is possible to set a predetermined temperature by means of a control device or a control circuit depending on the detected heating film temperature.

A temperature control device for controlling the temperature of the heating film can be provided. The temperature control device can be connected to a temperature sensor of the heating film or for the heating film in order to receive a measured actual temperature from the temperature sensor so that a predetermined temperature of the heating film is set or adjusted by means of an actual/set value comparison in the temperature control device connected to the heating film.

The heating film can have a positive temperature coefficient of electrical resistance.

Such object can be solved by a video endoscope having an outer cladding tube, wherein a fiber tube for an inner tube is accommodated in the outer cladding tube, wherein the fiber tube has a housing bounding a closed, for example, hermetically sealed, space with a distal end and a proximal end, wherein a front-side window is provided at the distal end of the fiber tube, wherein an inner tube for an imaging unit is accommodated in the fiber tube, and wherein a heating foil, for example, enclosing the inner tube, is provided between the fiber tube and the inner tube, wherein the heating foil is adapted to heat the front-side window at the distal end of the fiber tube.

By arranging the heating foil in a closed, for example, hermetically sealed, space of the housing of the fiber tube, the heating foil can be reliably protected from steam and cleaning liquids during reprocessing and/or disinfection by a corresponding reprocessing device, since no steam or liquids can penetrate into the closed or hermetically sealed space of the fiber tube, whereby the service life of the heating foil is significantly extended. Furthermore, the window glass hermetically soldered distally into the fiber tube can be heated by the heating foil during operation of the video endoscope in order to prevent fogging of the window glass (cover glass). The heating foil, for example being electrically operated, can be arranged between the fiber tube and the inner tube accommodated or arranged in the hermetically sealed fiber tube and at least partially or completely encloses the inner tube at least in the distal region in the circumferential direction of the inner tube. The interior of the fiber tube for receiving the inner tube and the exterior of the inner tube can be substantially complementary in shape and/or function.

The imaging unit of the videoscope can be arranged in the inner tube of the videoscope.

The heating foil can be protected from external moisture influences by being accommodated in the closed, for example hermetically sealed, housing of the fiber tube, so that its service life is significantly extended. The electrical connection of the heating foil for the heating power and a transmission of measuring signals of the temperature measurement can be carried out from the closed or hermetic space through a hermetically sealed electrical feedthrough at the proximal end of the fiber tube, e.g. by glass-cast contact pins or a soldered ceramic circuit board. If the fiber tube consists of several fiber tube components, these can be hermetically sealed together, e.g. by laser beam welding, forming a hermetically sealed housing of the fiber tube.

In a further embodiment of the video endoscope, the heating foil can comprise a heating surface, wherein the heating surface of the heating foil can be disposed at least at the distal end of the housing of the fiber tube. Thereby, the distal window of the fiber tube can be heatable or heated by means of the heating foil. From the heating foil surrounding the inner tube, heat can be transferred directly or indirectly to the fiber tube, whereby the distal hermetically soldered window of the fiber tube can also be heated.

The distal window can be heated by a heat flow from the heating foil to the fiber tube and from the fiber tube to the distal window glass (cover glass). Since the distal window is hermetically soldered to the fiber tube, the heat transfer from the fiber tube to the distal window is very well designed in terms of thermal conductivity. To ensure good thermal contact between the fiber tube and the heating foil, in one embodiment, the heating foil can be directly connected to the fiber tube by means of a contacting contact. Since the heating foil can be arranged inside the fiber tube, this embodiment ensures that the heating foil is in as direct contact as possible with an inner surface of the fiber tube facing the heating foil.

In one aspect, the fiber tube can have an inner mantle surface facing the heating foil, wherein the heating foil is in direct, contacting contact with the inner mantle surface of the fiber tube. This provides good heat transfer from the heating foil to the fiber tube and to the distal window during electrical operation of the heating foil. To ensure good heat contact, the heating foil can be in contact with the inner mantle surface of the fiber tube as circumferentially as possible, for example in the area of the heating surface, in order to maximize the heat transfer surface and thus reduce the thermal resistance between the heating foil and the fiber tube. In one embodiment, if there is a gap between the heating foil and the fiber tube, this gap can be made or kept small. The larger the heat transfer area between the heating foil and the inner mantle surface of the fiber tube, the more gap can be tolerated in one embodiment. To reduce the gap, a filler or a so-called gap filler in the form of a soft and/or flexible material can also be used so that an air gap over it is filled largely without gaps by its compression.

The heating foil can be arranged on the inner tube in a detachable and/or adhesive-free manner. The heating foil at least partially enclosing the inner tube does not have to be bonded or permanently fixed to the inner tube and/or the fiber tube, which can provide better reparability of the video endoscope and exchangeability of the heating foil.

Furthermore, the fiber tube can have an inner mantle surface facing the heating foil, wherein a gap is formed between the heating foil and the inner peripheral surface of the fiber tube. Thereby, the inner mantle surface of the fiber tube is not in contact with the heating foil.

For this purpose, a heat transfer material can be disposed in the gap between the heating foil and the inner mantle surface of the fiber tube. For example, a heat conductive paste or other heat transfer material can be arranged in the space between the heating foil and the inner mantle surface of the fiber tube, whereby heat is transferred from the heating foil to the fiber tube.

In order to fix the heating foil to the inner tube, according to a further embodiment of the video endoscope, the heating foil arranged on the inner tube can be surrounded by a heat shrink tube.

To place the heating surface of the heating foil as close as possible to the distal window (cover glass) in the fiber tube, the heating foil can be pushed proximally through the entire elongated fiber tube. In this regard, in one aspect, for example, the heating foil can be wrapped or placed around the inner tube (as a cylindrical body) and fixed to this inner tube, e.g., by bonding using an adhesive compound or an adhesive film or by another joining method. In another embodiment, the heating foil may also be circumferentially fixed to the outer circumferential surface of the inner tube or cylinder body by a heat shrink tube. Other methods such as a wrapping tape or the like are also possible. When mounting the video endoscope, the inner tube with the fixed heating foil can be inserted into the fiber tube and pushed to the distal window glass and the position between the inner tube (cylinder body) and fiber tube can be fixed.

When using a heat shrink tube to fix the heating foil to the inner tube, the heat shrink tube can be configured as a gap filler and/or as a rattle protection. Such configuration can permit simple replacement of the heating foil on the inner tube.

The heating foil can have a largely constant thickness, and in one embodiment the inner tube or the (inner) cylinder body and the fiber tube can have the same cross-sectional shape.

The heating foil can be disposed around the inner tube at least at the distal end of the inner tube. The heating foil can be arranged at the distal end with its heating surface in a cross-sectional C-shape abutting around the distal end of the inner tube.

The inner tube can have, at least at the distal end in a longitudinal portion, a cross-section with an annular contour, wherein the longitudinal portion of the inner tube with the annular contour can have, in cross-section in an outer peripheral zone portion of the longitudinal portion, a flattening, such as planar flattening, for a portion of the heating foil arranged on the flattening. Due to the flattening at the distal longitudinal portion of the inner tube, the heating foil can be formed with one or more temperature sensors, such as thermistors or the like, and a possible bending stress of the heating foil as well as of the temperature sensors can be reduced or prevented, since in the area of the flattening a corresponding portion of the heating foil lies flat on the flat flattening in the longitudinal portion of the inner tube.

Furthermore, at least one recess for receiving at least one or more temperature sensors for detecting the temperature in the region of the distal end of the inner tube and/or the heating foil can be provided in the region of the flattening of the inner tube for the heating tube. By forming a recess in the flattening of the longitudinal section of the inner tube, the temperature sensor or sensors can be arranged in the recess of the flattening in a space-saving manner. In this way, the temperature sensor or sensors connected to the heating foil can be protected from possible bending stress. The temperature sensors can be configured to detect the temperature at the distal end of the inner tube as well as at the distal end of the heating foil and in the distal gap between the heating foil and the fiber tube, which can be filled with a filler material.

In order to reliably detect the temperature of the heating foil, e.g. for a temperature regulation or a temperature control, according to a further embodiment of the video endoscope, the temperature sensor or sensors can each be provided as a thermistor or as a temperature sensor IC (temperature sensor integrated circuit). For example, the heating foil can have at least two temperature sensors, which results in higher reliability due to possible redundancy. For temperature measurement, for example, a temperature sensor, e.g. a thermistor, can be implemented or formed on the heating foil. Two redundant temperature sensors, e.g. two thermistors with low thermal resistance can be provided for safety. In another aspect, SMD thermistors soldered to the heating foil can be provided as temperature sensors. In another embodiment, temperature sensor ICs, such as having digital data transmission, can be used as temperature sensors.

The heating foil can have a cut-out in a transition region between a longitudinal section of the inner tube having the cross-section with the annular contour and the longitudinal portion of the inner tube with the flattening. Due to the cut-out of the heating foil in the transition between a curved longitudinal section of the inner tube and the longitudinal section of the inner tube with the flattening, a stress or mechanical load on the heating foil as well as the temperature sensors connected thereto can be reduced. The longitudinal section of the inner tube with the cross-section having the annular contour can be continuously curved in the circumferential direction.

The inner tube can be provided as a cylindrical body with a receiving space for an imaging unit and/or that an imaging unit can be arranged in the inner tube.

The cylindrical body can be made of metal or stainless steel.

The window can be hermetically sealed with a window glass made of sapphire.

A hermetically sealed electrical contacting device for electrically operated units can be provided inside the fiber tube at the proximal end of the fiber tube and/or that a hermetic seal or connection can be provided between the fiber tube and the inner tube at the proximal end of the fiber tube. In embodiments, the proximal hermetically sealed electrical contacting means of the fiber tube can be provided with, for example, glass-cast contact pins or with a soldered ceramic circuit board. In one embodiment, for example, the contacting device can be configured as a plug connection or the like.

Furthermore, an optical fiber bundle can be arranged along the longitudinal direction of the fiber tube between the outer cladding tube and the fiber tube. By the optical fiber bundle, for example, an object in the region of the distal window of the fiber tube can be illuminated.

The fiber tube can be made of metal or stainless steel.

The fiber tube can have a housing defining a hermetically sealed space with a distal end and a proximal end.

BRIEF DESCRIPTION OF THE DRAWINGS

Further features will become apparent from the description of the embodiments together with the claims and the attached drawings. Embodiments can fulfill individual features or a combination of several features.

The embodiments are described below, without restricting the general idea, using exemplary embodiments with reference to the drawings, wherein we expressly refer to the drawings with regard to all details that are not explained in greater detail in the text. In the figures.

In the drawings, in each case the same or similar elements and/or parts are provided with the same reference numbers, so that in each case a repeated introduction is omitted.

DETAILED DESCRIPTION

Figure 1:
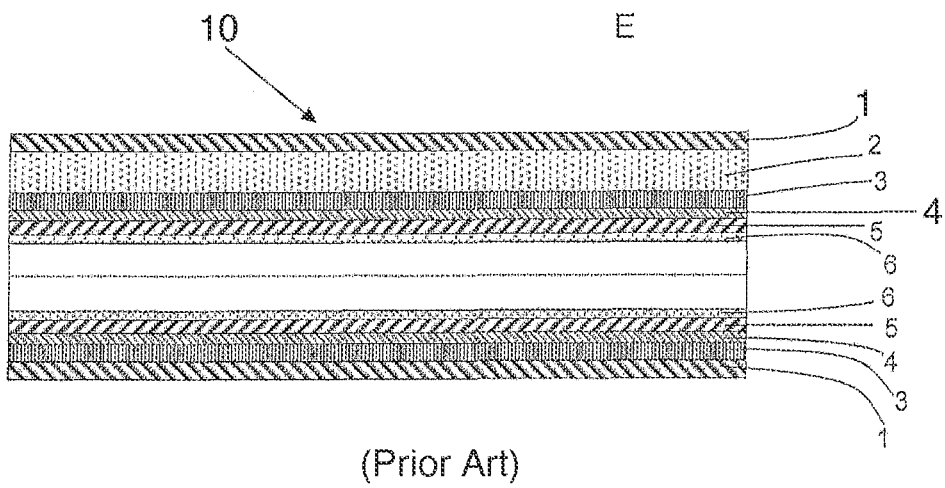
FIG. 1 schematically illustrates a cross-section through a distal end region of an endoscope shaft according to the prior art, and FIG. 2 schematically illustrates a cross-section through a distal end region of an endoscope shaft.
Figure 2:
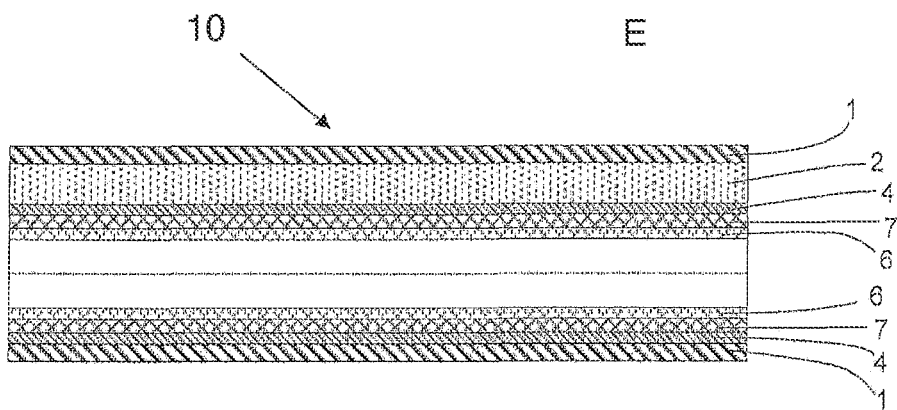

In FIG. 2, a section of an endoscope shaft 10 of a video endoscope E is schematically represented in cross-section. The distal end region of the endoscope shaft 10 is shown schematically in FIG. 2. A fiber tube 4 is disposed in the interior of the outer casing tube 1, wherein the elongated inner casing tube 6 is disposed in the interior of the fiber tube 4. Between the fiber tube 4 and the inner casing tube 6, a heating film 7, which may be a foil, is disposed that is in direct contact with the fiber tube 4 and the inner casing tube 6. The heating film 7 can be configured from Kapton®. In addition, corresponding attaching means for the resistance heating of the heating film 7 are also provided in order to cause a warming of the fiber tube 4.

Figure 3:
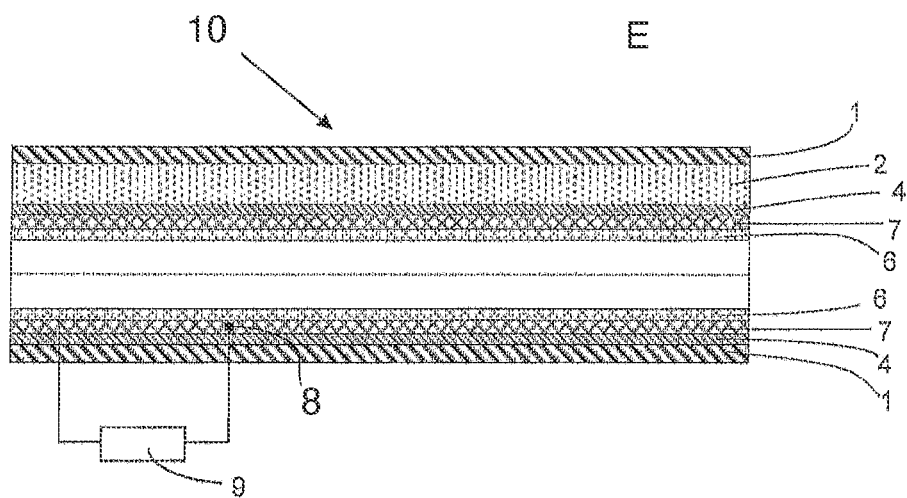
FIG. 3 schematically illustrates a cross-section through a distal end region of an endoscope shaft with a temperature control.

In FIG. 3, a cross-section through an endoscope shaft is schematically represented, wherein, in contrast to the exemplary embodiment in FIG. 2, a temperature control for the heating film 7 is possible. The heating film 7 has a temperature sensor 8, by means of which the temperature of the heating film 7 is detected. When electric current is applied to the heating film 7, it is warmed so that the temperature of the heating film 7 established by the temperature sensor 8 is transmitted to a temperature control device 9, such as a controller, computer or CPU. After an actual/set value comparison in the temperature control device 9, the strength of the electric current for the heating film 7 is correspondingly controlled so that a preferred temperature in the heating film is set and held constant.

Figure 4:
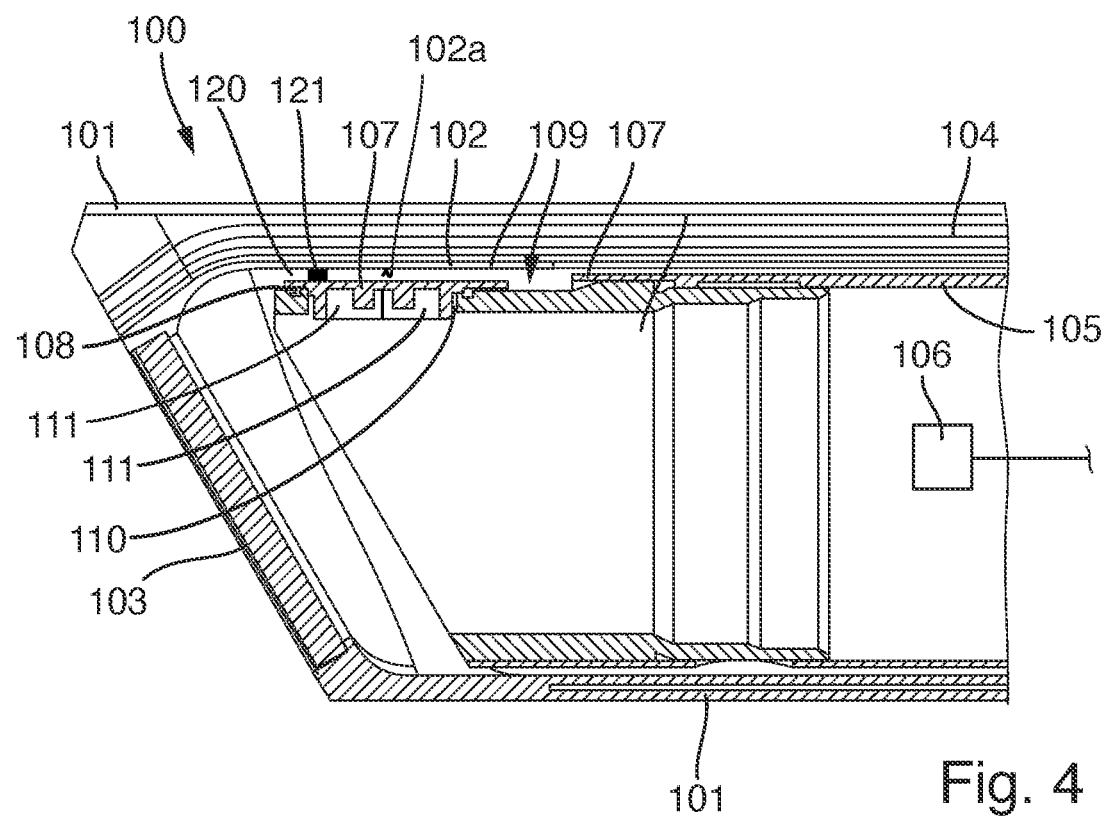
FIG. 4 illustrates a schematic cross-sectional view of a distal end of a video endoscope.
Figure 5:
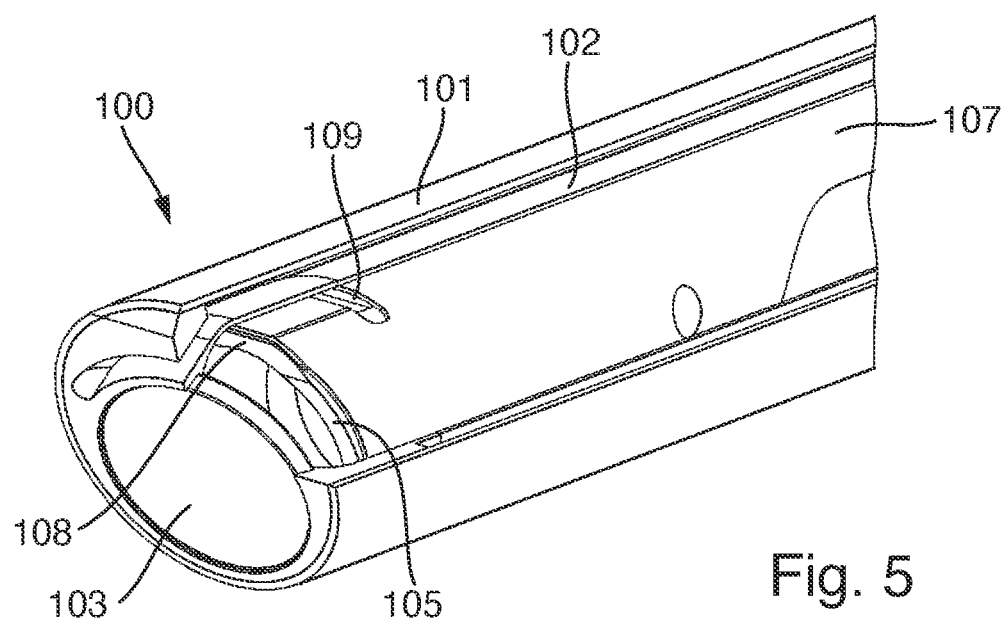
FIG. 5 illustrates a schematic perspective view of the distal end of the video endoscope of FIG. 4 in section.

FIG. 4 schematically shows a distal end of a video endoscope 100 in a cross-sectional view. FIG. 5 schematically shows the distal end of the video endoscope 100 in a perspective view in section, wherein a portion of the outside of the video endoscope is shown cut-away for better representability.

The video endoscope 100 has an elongated shaft with an outer cladding tube 101 in which a hermetically sealed fiber tube 102 is disposed. At the distal end of the fiber tube 102, the fiber tube 102 is provided with a cover glass 103 soldered into the fiber tube 102. In this regard, the cover glass 103 is arranged at the distal end of the fiber tube 102 with an inclination to the longitudinal extension of the fiber tube 102. In another embodiment of a video endoscope 100, the cover glass 103 is arranged without inclination to the longitudinal extension of the fiber tube 102 at the distal end (cf. FIG. 10). In this case, the outer cover tube 101 and the fiber tube 102 are part of the endoscope shaft of the video endoscope 100.

In FIG. 5, a portion of the outer cladding tube 101 and the fiber tube 102 are shown cut-away, i.e., not shown in their entirety for a better view of the other units inside the video endoscope 100.

An optical fiber bundle 104 is disposed between the hermetically formed fiber tube 102 and the outer cladding tube 101 surrounding the fiber tube 102 along the longitudinal extent of the video endoscope 100 to direct light from a light source (not shown here) to the location at the distal end of the video endoscope 100 in front of the cover glass 103.

An inner tube 105 is accommodated inside the hermetically sealed fiber tube 102. The inner tube 105 can be formed as a cylindrical body, wherein an image sensor 106 is arranged inside the inner tube 105, for example, as a component of an imaging unit of the video endoscope 100 to detect the light entering through the cover glass 103. An optical assembly including optical lenses and prisms is disposed between the cover glass 103 and the image sensor 106, although these are not shown for clarity reasons.

The inner tube 105 is enclosed on its outer surface by an electrically operable heating foil 107 at its distal end. The heating foil 107 is thereby arranged between the inner tube 105 and the hermetically sealed fiber tube 102 and is in contact with the heating foil 107 of the inner mantle surface 102a of the fiber tube 102. As shown in FIG. 4, the heating foil 107 in the right part of FIG. 4 is in contact with the inner mantle surface 102a of the fiber tube 102. When the heating foil 107 is electrically operated, the heating foil 107 is heated and the heat is transferred from the heating foil 107 due to a direct or indirect contact with the inner mantle surface 102a of the fiber tube 102. The heat transfer to the fiber tube 102 heats the distal cover glass 103, which is made of sapphire, for example, preventing fogging of the cover glass 103.

In another embodiment, between the heating foil 107 and the fiber tube 102, a gap 120 is filled with a filler material 121 (see left part of FIG. 4), such as a flexible material. The combination of the inner tube 105, the heating foil 107 and the filler material 121 between the heating foil 105 and the fiber tube 102 is referred to as the R-unit.

Figure 6:
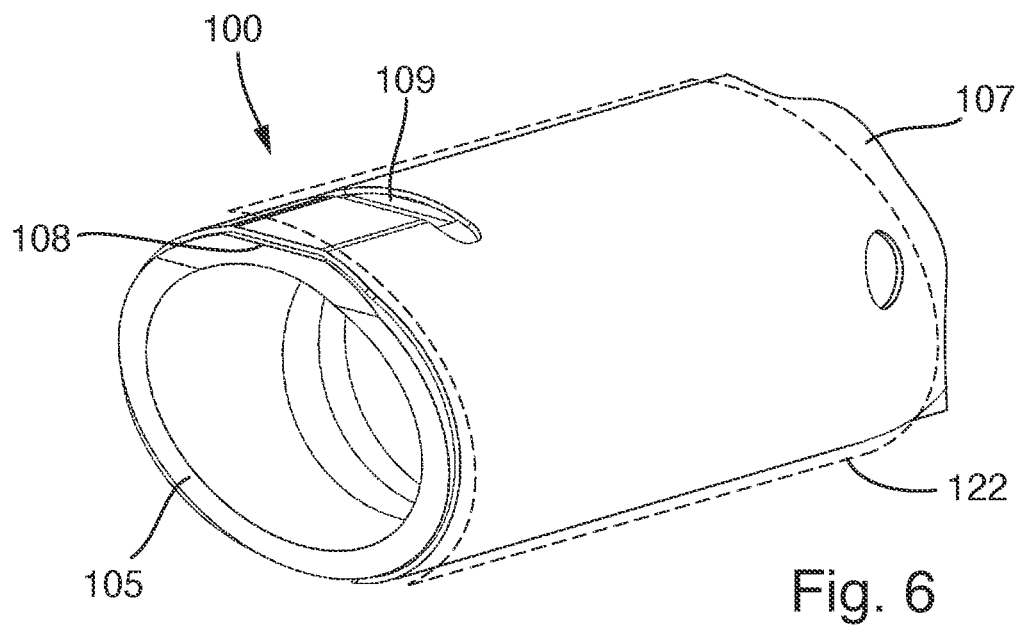
FIG. 6 illustrates a schematic cutaway perspective view of a distal end of an inner tube provided with a heating foil.
Figure 7:
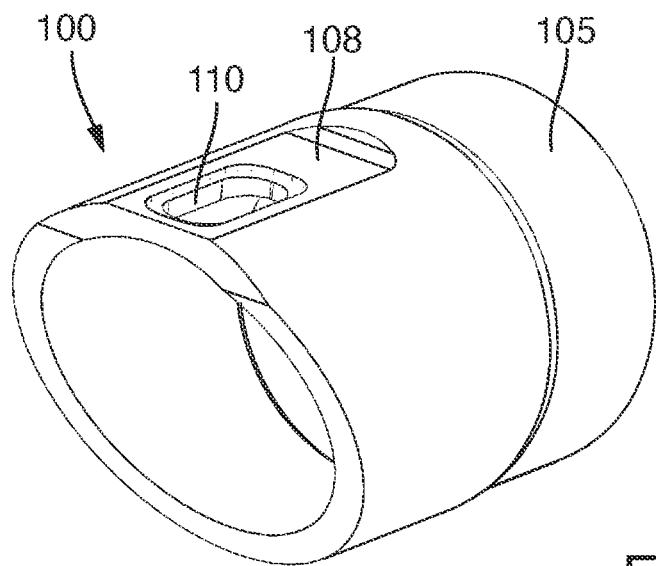
FIG. 7 illustrates a schematic cutaway perspective view of a distal end of the inner tube without heating foil.

FIG. 6 shows a schematic perspective view of a distal end of the inner tube 105 provided with the heating foil 107. FIG. 7 shows a perspective view of the distal end of the inner tube 105 without the heating foil. The inner tube 105 has a circular or annular cross-section along its longitudinal extent. At the distal end of the inner tube 105, the inner tube 105 is provided with a flat flattening 108 in a longitudinal section (see FIG. 7), wherein the heating foil 107 also abuts on the outer side of the flattening 108. Thereby, the heating foil 107 has a cut-out 109 in the transition between the circular or annular cross-section to the longitudinal section with the flattening 108.

As can be seen from FIG. 7, the flattening 108 has a recess 110 for a at least one temperature sensor 111 (cf. FIG. 4). The temperature sensor 111 is arranged here on the inside of the heating foil 107 and is arranged in the recess 110 (cf. FIG. 4) when the heating foil 107 is wrapped around the inner tube 105. In the embodiment shown in FIG. 4, the heating foil 107 has two temperature sensors 111.

Figure 8:
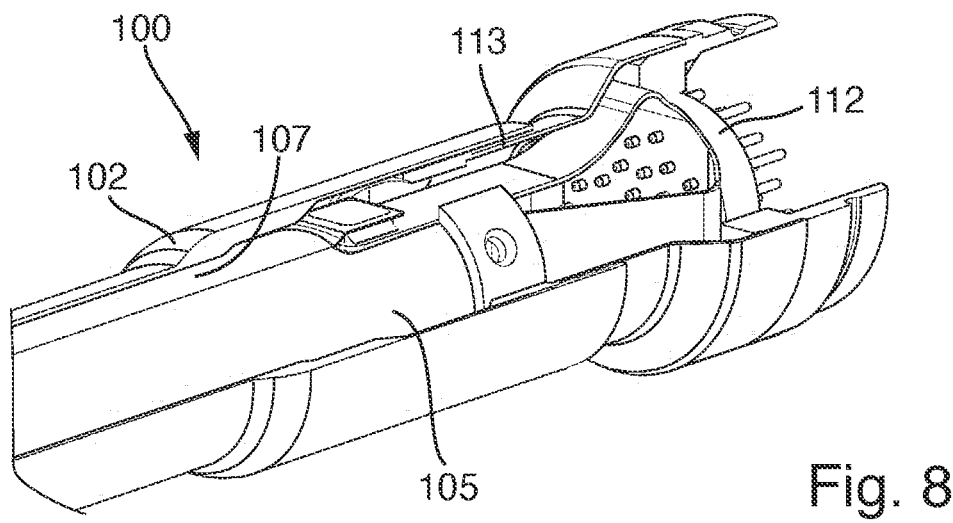
FIG. 8 illustrates a schematic perspective view of a proximal end of the video endoscope in section.

In FIG. 8, a portion of a perspective view of a proximal end of the video endoscope 100 is schematically shown, wherein, analogous to FIG. 5, the proximal end is shown with a portion of the fiber tube 102 cut-away. The hermetically sealed fiber tube 102 has a hermetically sealed electrical contacting device 112 at its proximal end, for example with glass encapsulated contact pins. By means of the contacting device 112, external electrical control units are connected to the electrical units arranged for this purpose inside the fiber tube 102, such as the image sensor 106 provided in the inner tube 105, or the heating foil 107 arranged on the outside of the inner tube 105.

The fiber tube 102 is hermetically connected to the contacting device 112 at the proximal end in the circumferential direction at a circumferential solder joint 113. In other words, the so-called R-unit, consisting of inner tube 105, heating foil 107 and the filler material between the heating foil 105 and the fiber tube 102, and the fiber tube 102 are hermetically sealed at the proximal end.

Figure 9:
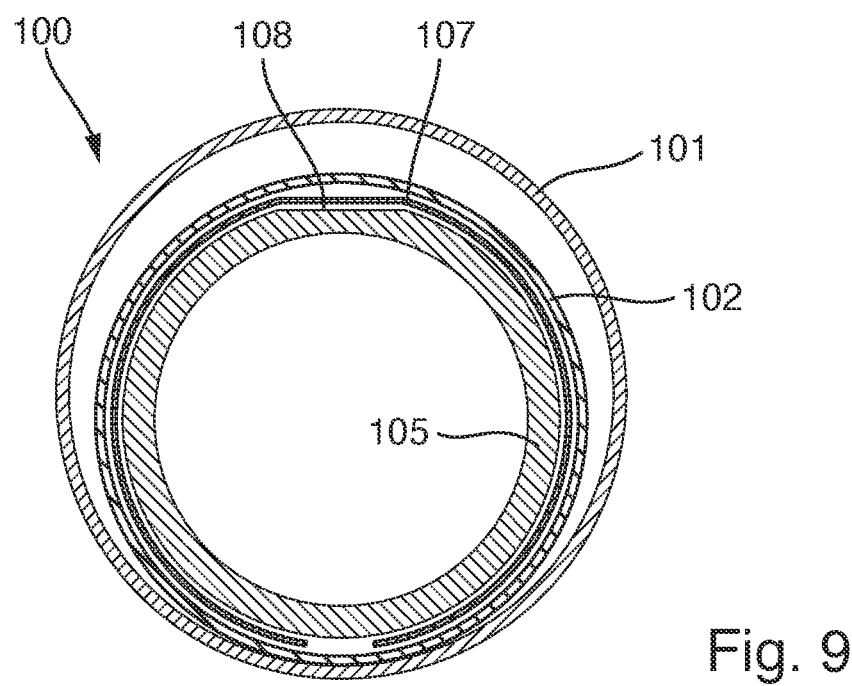
FIG. 9 illustrates a schematic cross-section through the distal end of the video endoscope of FIG. 4

FIG. 9 schematically shows a cross-section through the distal end of the video endoscope 100 shown in FIGS. 4 and 5. The hermetically sealed fiber tube 102 is received in the outer cladding tube 101. Inside the longitudinally-extended fiber tube 102 is the inner tube 105. Between the inner tube 105 and the inner envelope surface of the fiber tube 102 facing the inner tube 105 is arranged the heating foil 107, which surrounds or encloses the inner tube 105 on the outer side of the inner tube 105. In this regard, the heating foil 107 surrounds the inner tube 105 with a C-shaped cross-section. Furthermore, in FIG. 9, the flattening 108 at the distal end of the inner tube 105 is apparent, on which the heating foil 107 rests at the distal tip of the inner tube 105.

In one embodiment, the heating foil 107 is surrounded by a thin heat shrink tube 122 (as indicated with a dashed line in FIG. 6), the drawing of which has been omitted for ease of illustration, whereby the heating foil 107 is secured to the inner tube 105. In the gap between the heating foil 107 and the inner mantle surface 102a of the fiber tube 102 facing the heating foil 107, a filler material is provided in one embodiment for transferring the heat from the heating foil 107 to the fiber tube 102. In one embodiment, the filler material may be made of a thermally conductive material. In one embodiment, the filler material is, for example, a thermally conductive paste or the like.

Figure 10:
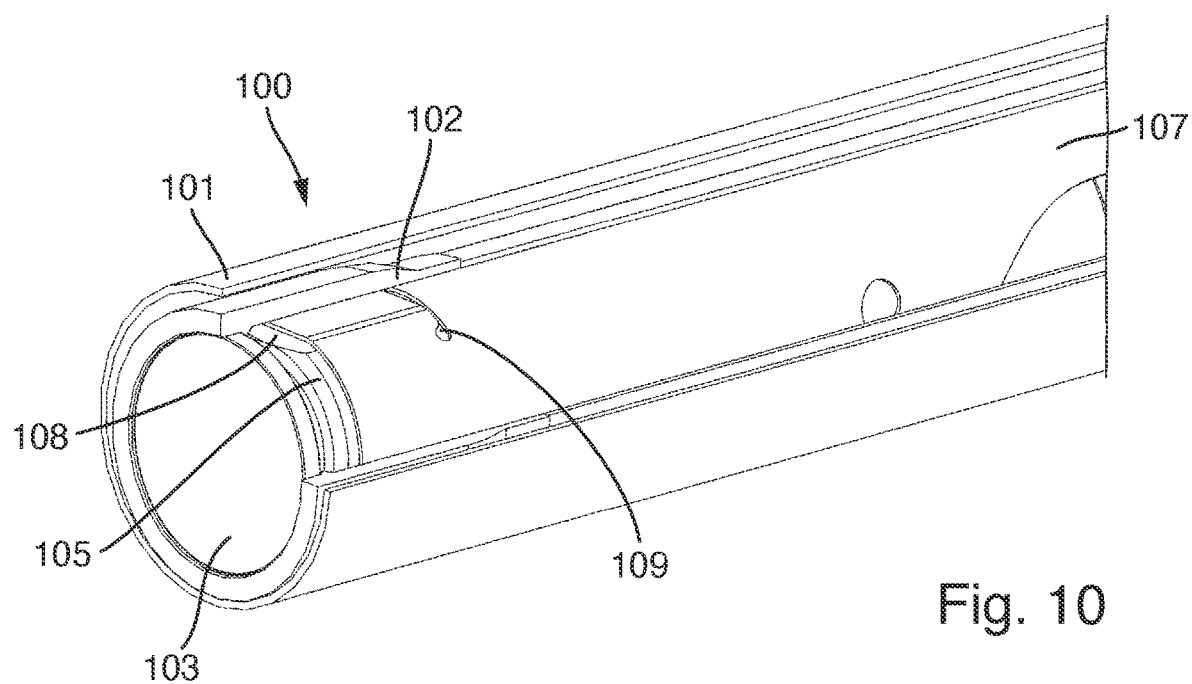
FIG. 10 illustrates a schematic perspective view of a distal end of a video endoscope according to a further embodiment in section.

In FIG. 10, another embodiment of a video endoscope 100 is shown in a perspective view. The embodiment of the video endoscope 100 differs from the embodiment of the video endoscope of FIG. 5 in that the distal cover glass 100 is not inclined to the longitudinal extent of the fiber tube 102 or the outer cladding tube 101. That is, the surface normal of the cover glass 103 is parallel to the longitudinal axis of the video endoscope 100 or the longitudinal axis of the endoscope shaft.

While there has been shown and described what is considered to be preferred embodiments, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

REFERENCE SIGN LIST

1 Outer casing tube
2 Optical fibers
3 Heating film
4 Fiber tube
5 Heat-shrinkable sleeve
6 Inner casing tube
7 Heating film
8 Temperature sensor
9 Temperature control device
10 Endoscope shaft
100 Video endoscope
101 Outer cladding tube
102 Fiber tube
102a Inner mantle surface
103 Cover glass
104 Fiber optic bundle
105 Inner tube
106 Image sensor
107 Heating foil
108 Flattening
109 Cut-out
110 Recess
111 Temperature sensor
112 Contacting device
113 Solder joint
120 Gap
121 Filler material
122 Heat shrink tube
E Video endoscope

What is claimed is:

1. A video endoscope comprising:
an outer cladding tube,
a fiber tube accommodated in the outer cladding tube, wherein the fiber tube has a housing bounding a closed space, the fiber tube having a distal end and a proximal end, wherein a front-side window is provided at the distal end of the fiber tube, the fiber tube having an inner tube for accommodating an imaging sensor,
a heating film layer configured to generate heat, the heating film layer provided between the fiber tube and the inner tube, and
a temperature sensor;
wherein the heating film layer is configured to heat the front-side window at the distal end of the fiber tube;
the inner tube has at least at a distal end in a longitudinal portion a cross-section with an annular contour, wherein the longitudinal portion of the inner tube with the annular contour in cross-section has in an outer peripheral zone portion of the longitudinal portion a flattening, a portion of the heating film layer being arranged on the flattening;
the heating film layer has a cut-out in a transition region between the longitudinal portion of the inner tube having the cross-section with the annular contour and the longitudinal portion of the inner tube having the flattening;
the flattening has a recess; and
the temperature sensor is disposed in the recess and covered by the heating film layer.

2. The video endoscope of claim 1, wherein the heating film layer is formed from plastic and the heating film layer has a sleeve-shape and completely surrounds the inner tube.

3. The video endoscope of claim 1, wherein the heating film layer comprises a heating surface, wherein the heating surface of the heating film layer is disposed at least at a distal end of the housing of the fiber tube.

4. The video endoscope of claim 1, wherein the fiber tube has an inner mantle surface facing the heating film layer, and the heating film layer is in direct contact with the inner mantle surface of the fiber tube.

5. The video endoscope according to claim 4, wherein the heating film layer is arranged on the inner tube in one or more of a detachable and adhesive-free manner.

6. The video endoscope of claim 1, wherein the fiber tube has an inner mantle surface facing the heating film layer, wherein a gap is formed between the heating film layer and the inner mantle surface of the fiber tube.

7. The video endoscope of claim 6, further comprises a heat transfer material disposed in the gap between the heating film layer and the inner mantle surface of the fiber tube.

8. The video endoscope according to claim 1, wherein the heating film layer arranged on the inner tube is surrounded by a heat shrink tube.

9. The video endoscope of claim 1, wherein the heating film layer is disposed around the inner tube at least at a distal end of the inner tube.

10. The video endoscope according to claim 1, wherein the flattening is planar.

11. The video endoscope according to claim 1, wherein the temperature sensor comprises one or more of a thermistor or a temperature sensor IC (Integrated Circuit).

12. The video endoscope according to claim 1, wherein the inner tube having a cylindrical body with a receiving space for accommodating the imaging sensor.

13. The video endoscope according to claim 12, wherein the cylindrical body is made of metal.

14. The video endoscope according to claim 1, wherein the front side window is a hermetically sealed and made of sapphire.

15. The video endoscope of claim 1, further comprising a hermetically sealed electrical contact inside the fiber tube at the proximal end of the fiber tube, the electrical contact being electrically connected to one or more of the heating film layer and the imaging sensor.

16. The video endoscope according to claim 1, further comprising an optical fiber bundle arranged along a longitudinal direction of the fiber tube between the outer cladding tube and the fiber tube.

17. The video endoscope according to claim 1, wherein the fiber tube is made of metal.

18. The video endoscope according to claim 1, wherein the housing defining a hermetically sealed space having a distal end and a proximal end.

* * * * *